US012647656B2

(12) United States Patent
Bingham et al.

(10) Patent No.: US 12,647,656 B2
(45) Date of Patent: Jun. 2, 2026

(54) SYSTEM AND METHODS FOR POSITIONING CAPTIONING IN A VIDEO FILE

(71) Applicant: 2G Digital Post, Inc., Burbank, CA (US)

(72) Inventors: William Bingham, Burbank, CA (US); Miko Filppula, Burbank, CA (US); Jordan Jacobs, Burbank, CA (US); Fernando Vazquez, Burbank, CA (US)

(73) Assignee: 2G Digital Post, Inc., Burbank, CA (US)

( * ) Notice: Subject to any disclaimer, the term of this patent is extended or adjusted under 35 U.S.C. 154(b) by 0 days.

(21) Appl. No.: 18/618,905

(22) Filed: Mar. 27, 2024

(65) Prior Publication Data

US 2024/0334022 A1     Oct. 3, 2024

Related U.S. Application Data

(60) Provisional application No. 63/492,414, filed on Mar. 27, 2023.

(51) Int. Cl.
    *H04N 21/488*      (2011.01)
    *G06V 10/25*      (2022.01)

(52) U.S. Cl.
    CPC ......... *H04N 21/4884* (2013.01); *G06V 10/25* (2022.01)

(58) Field of Classification Search
    CPC ......... H04N 21/4884; H04N 21/23418; H04N 21/44008; G06V 10/25
    USPC ....................................................... 725/116
    See application file for complete search history.

(56) References Cited

U.S. PATENT DOCUMENTS

| | | | |
|---|---|---|---|
| 9,456,170 B1 * | 9/2016 | Miller | .................... G11B 27/10 |
| 9,900,665 B2 * | 2/2018 | Ramnani | ........... H04N 21/4424 |
| 2017/0223303 A1 * | 8/2017 | Chaudhri | ........... H04N 21/4884 |
| 2019/0158927 A1 * | 5/2019 | Catalano | ................. G10L 21/10 |
| 2022/0283697 A1 | 9/2022 | Li | |
| 2023/0007360 A1 | 1/2023 | Gupta | |
| 2023/0138712 A1 * | 5/2023 | Ozawa | .................. H04L 65/612 |
| | | | 709/219 |
| 2023/0368532 A1 * | 11/2023 | Bishop | ................... G06V 10/82 |
| 2025/0209794 A1 * | 6/2025 | Seybold | ................. G06V 10/77 |

OTHER PUBLICATIONS

International Search Report and Written Opinion, PCT/US2024/021792 mailed Jul. 11, 2024, 8 pages.

* cited by examiner

*Primary Examiner* — Sahar Aqil Riaz
(74) *Attorney, Agent, or Firm* — NIXON PEABODY LLP

(57) ABSTRACT

A system and method for automatic positioning of a closed caption in an image frame to avoid overlapping with text or graphics in the image is disclosed. A video event file includes a time code and a position of an object on at least one frame of the video file and a caption event file that includes a time code and a corresponding caption are provided. A captioning engine determines an overlap between the time codes of the video event and the caption and compares the position of the graphic to a default position of the caption. A positioning engine applies the caption to a selected position on the image that does not interfere with the graphic if an overlap occurs between the time codes and the positions of the video event and the caption. A video output outputs a modified video file with the applied captions.

21 Claims, 9 Drawing Sheets illustrations of the formula for interval comparison to determine overlap with a tolerance
of *n*=1: if ((caption_in - *n*\*.5) <= (video_out + *n*\*.5)) AND
((video_in - *n*\*.5) <= (caption_out + *n*\*.5))

FIG. 6

SYSTEM AND METHODS FOR POSITIONING CAPTIONING IN A VIDEO FILE

PRIORITY CLAIM

The present disclosure claims benefit of and priority to U.S. Provisional Ser. No. 63/492,414, filed Mar. 27, 2023. The contents of that application are hereby incorporated by reference in their entirety.

TECHNICAL FIELD

The present disclosure relates generally to placement of captions for media content. More particularly, aspects of this disclosure relate to a system that allows the positioning of captions to avoid blocking images or text on a screen.

BACKGROUND

Closed captioning is text that mirrors dialog in a media file such as a video clip. Closed captioning is generally applied through a separate file that is superimposed on the images in a video. The superimposed captioned file is then ready for playback. Closed captioning generally is located in a single position in each frame such the bottom of the image frame. However, when a caption or subtitle event covers on-screen text or other graphics during playback the viewer is unable to read the on-screen text which results in an incomplete viewer experience.

Caption and subtitle files are often repurposed from other versions of the same TV show or feature film such as a director's cut or broadcast to avoid recreating the caption file from scratch. This repurposing is less expensive than recreating or originating the file from transposing the dialog in the show or film. The positioning of the cations from the file are currently placed in a singular position in each of the frames in a media file. As such, captions may overlap on-screen text or other objects. FIG. 1 shows a screen image 10 of a frame 12 of a video clip. The frame 12 includes closed captions 20 applied by prior art systems. The closed captions 20 are generally positioned at a bottom area 22. Thus, the closed captions 20 may obscure certain elements such as text in the area 22.

Streaming platforms and content owners of television and feature films are mandated by the FCC to ensure the conformance of captions and subtitles which cover instances of on-screen text. Content providers may be penalized by the FCC for broadcasting poorly conformed captions.

Without an automated solution the only way to properly position captions from a file is to perform a full watch of the media file, spot time code in/out of on-screen text events and manually repositioning the caption file in specialized caption editing software to an open location in various frames. Currently the only way to properly conform subtitle and caption files is through a manual process, which is relatively expensive. There are some automated solutions, but they are not accurate enough to satisfy the FCC requirement of accuracy.

Thus, there is a need for an automated system to position captions in a media file. There is a further need for a method outlined in this document is a way to streamline and make more efficient the process allowing streaming platforms and content owners to have the assurance of an accurate, cost-effective conforming service. There is a further need for an automated solution that is accurate enough to satisfy regulatory requirements.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter; nor is it intended to be used in isolation to determine the scope of the claimed subject matter. The subject matter should be understood by reference to appropriate portions of the entire specification of this disclosure, any or all drawings and each claim.

One disclosed example is a system for positioning a caption on an image in a video file. The system includes a storage device storing a video event file and a caption event file. The video event file includes a time code and a position of an object on at least one frame of the video file. The caption event file includes a time code and a corresponding caption. A captioning engine determines an overlap between the time codes of the video event and the caption and compares the position of the graphic to a default position of the caption. A positioning engine assigns the caption to a selected position on the image that does not interfere with the graphic if an overlap occurs between the time codes and the positions of the video event and the caption. An output produces a modified caption event file with the assigned captions.

In another disclosed implementation of the example system, the video event is text. In another disclosed implementation, the video event is an object. In another disclosed implementation, the object and the position of the object is determined by a scan of the frames in the video file images via a video analysis application. In another disclosed implementation, the position is one of a top, middle or bottom of the frame. In another disclosed implementation, the video event file includes a bounding box associated with the video event. In another disclosed implementation, a default position of the caption is the top of the frame or the bottom of the frame. The captioning engine applies the caption in the default position when no overlap in time codes or position occurs. In another disclosed implementation, the storage device stores a preset requirement file. The present requirement file includes at least one preset requirement that must be met for the positioning engine to apply the caption to the selected position. In another disclosed implementation, the at least one preset requirement includes one of a group consisting of a minimum video event confidence score; a minimum video event height for a bounding box of the video event; a minimum video event text length; a set of safe area dimensions of the frame; and an overlap tolerance. In another disclosed implementation, the system includes a transmission interface to send the modified caption file to a broadcast system broadcasting the video event file.

Another disclosed example is a method of positioning a caption that includes reading a position of a video event on a frame from a video position file. A caption of a closed caption file associated with a time stamp of the frame is received. A position on the frame that does not interfere with the video event is selected. A modified closed caption file with the selected position of the caption is output.

In another disclosed implementation of the example method, the method further includes applying the caption on the selected position on the frame from the modified closed caption file to output a frame of a modified video file. In another disclosed implementation, the video event is text or an object. In another disclosed implementation, the video event and the position of the video event is determined by a scan of the frame via a video analysis application. In another disclosed implementation, the position is one of a top, middle or bottom of the frame. In another disclosed implementation, the video event includes a bounding box associated with the video event. In another disclosed implementation, a default position of the caption is the top of the frame or the bottom of the frame. The caption is applied in the default position when no overlap in time codes or position occurs. In another disclosed implementation, the example method includes accessing a preset requirement file. The present requirement file includes at least one preset requirement that must be met to apply the caption to the selected position. In another disclosed implementation, the at least one preset requirement includes one of a group consisting of a minimum video event confidence score; a minimum video event height for a bounding box of the video event; a minimum video event text length; a set of safe area dimensions of the frame; and an overlap tolerance.

Another disclosed example is a non-transitory computer readable medium having stored thereon software instructions that, when executed by a processor, cause the processor to read a position of a video event on a frame from a video position file. The instructions cause the processor to receive a caption of a closed caption file associated with a time stamp of the frame. The instructions cause the processor to select a position on the frame that does not interfere with the video event. The instructions cause the processor to apply the caption on the selected position on the frame to output a frame of a modified video file.

BRIEF DESCRIPTION OF THE DRAWINGS

The disclosure will be better understood from the following description of exemplary embodiments together with reference to the accompanying drawings, in which:

FIG. 6 is an example of a routine to position captions in a video file when operating with a default bottom position for a caption;

Figures 1, 2:
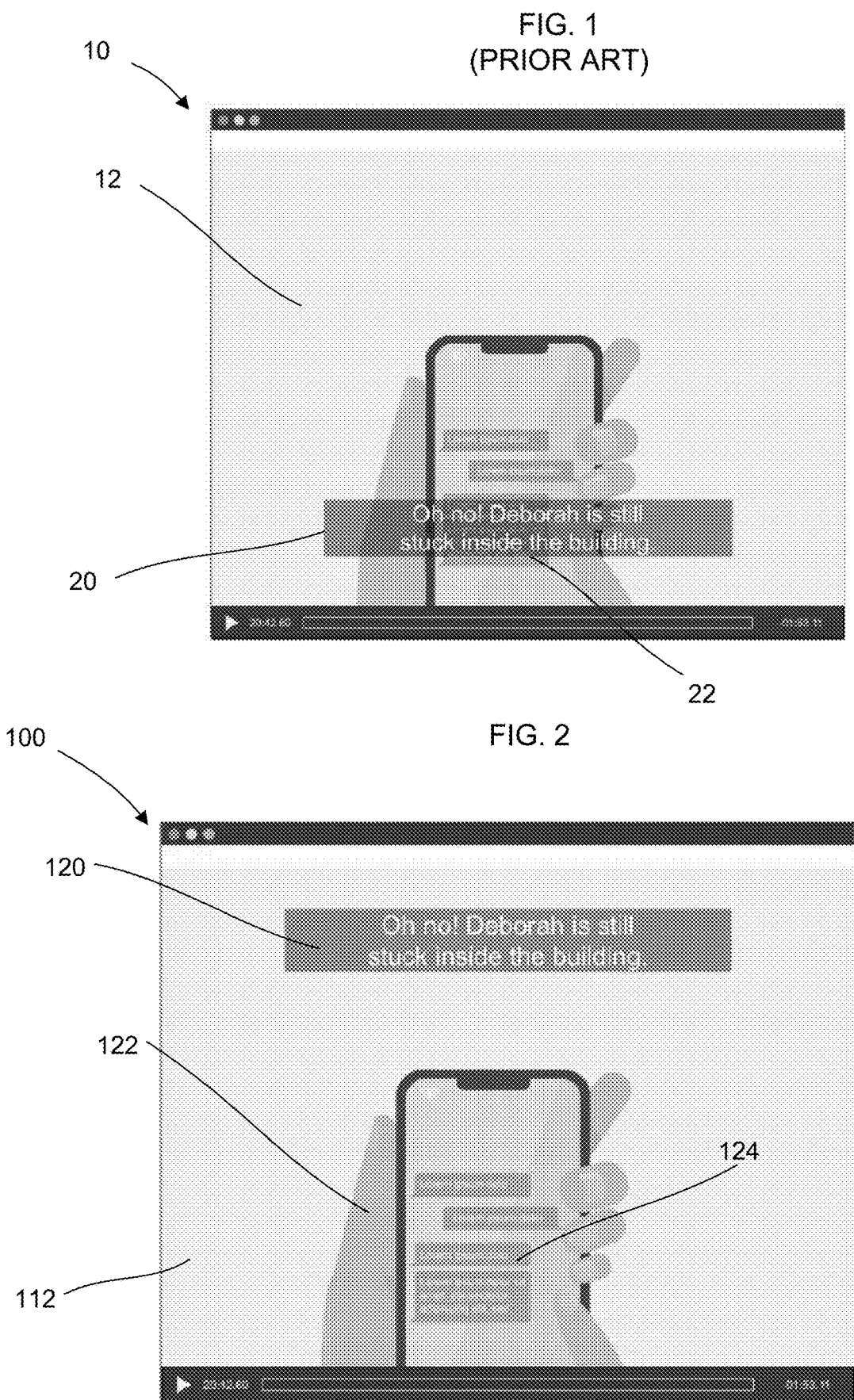
FIG. 1 is a screen image with captioning applied by prior art systems that may obscure certain elements such as text in images of a video file.
FIG. 2 is a screen image of a repositioned caption in an image frame of a video file applied by the example system.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure is directed toward a method for processing an on-screen text event position report of a video file to find each on-screen text event with time code in, time code out, and bounding box coordinates. The bounding box coordinates of the on-screen text are supplied as percentages relative to total video dimensions. The bounding box coordinates are processed to determine the position of each on-screen text event on a screen frame as the bottom third, middle third or top third of the frame. Timed text caption files that are in sync with the video file are processed to determine time code in, time code out, and the position of each caption event to be placed in the frame. The time codes of caption events are compared against on-screen text events to determine if the time code intervals overlap. If the time code intervals do overlap, the position of the caption event is compared against the position of the on-screen text event to determine if the caption event will cover or interfere with the on-screen text event. In cases that the caption event covers or interferes with the on-screen text event, the caption coordinates are moved to another location on the image. The example system and method streamlines and make more efficient the captioning process. This allows streaming platforms and content owners to have the assurance of an accurate, cost-effective conforming service.

FIG. 2 is a screen image 100 of a frame 112 of a video file that includes a repositioned caption 120 that is produced from the example captioning system. As explained above, each frame such as the frame 112 is processed by the example system to automatically reposition a caption such as the caption 120 if a video event 124 such as text is present in the default caption position. Thus, the caption 120 is in a position that does not interfere with text or other identified graphics of the video event 124 in an area 122 of the frame 112.

In the example in FIG. 2, a video on-screen text positioning report is processed and loaded into an example captioning engine. For example, an on-screen video event such as the text video event 124 may have a time code start of 00:23.125 and a time code end of 00:27.014 that indicates the frames the video event occurs in. The bounding box of the text event may be determined to be in the top third (top), bottom third (bottom) or middle third (middle) of the video frame using the percentage of video dimensions. The top left and bottom left y coordinates of the video event and a percentage of total video height are passed into a function. The function determines if y<0.33, if this is the case then the bounding box occupies the "top" of the frame. If y<0.66 then the bounding box occupies the "middle" of the frame. If neither condition is met, the bounding box occupies the "bottom" of the frame. Both the top left and bottom left y coordinates are tested because the bounding box of a video event can occupy on or more regions of the video. A caption file is also processed by the captioning engine. The caption file includes a time code start (e.g., 00:21.027), a time code end (e.g., 00:24.820) and the position of the default position of captions such as the caption 120 (top or bottom of the frame). The example captioning engine compares the time codes of the video text event and the caption event to determine if there is an overlap. The captioning engine automatically repositions a bottom caption event to the top of the frame if it overlaps with a video event in the lower third of the frame. The example captioning engine automatically moves a caption positioned in the top third of the frame back to the bottom of the frame if the caption does not overlap with a detected on-screen text video event, or if the caption does overlap but the video event is not in the lower one third of the frame. A tolerance variable may be used to determine the amount of overlap between the bounding box of the video event and the caption necessary to reposition the caption. The default position of the caption may be in different positions other than the bottom of the screen. Certain preset parameters may be considered such as safe areas of the image that are overlapped by the video event, and minimum requirements for events such as size that would trigger moving the caption.

Figure 3:
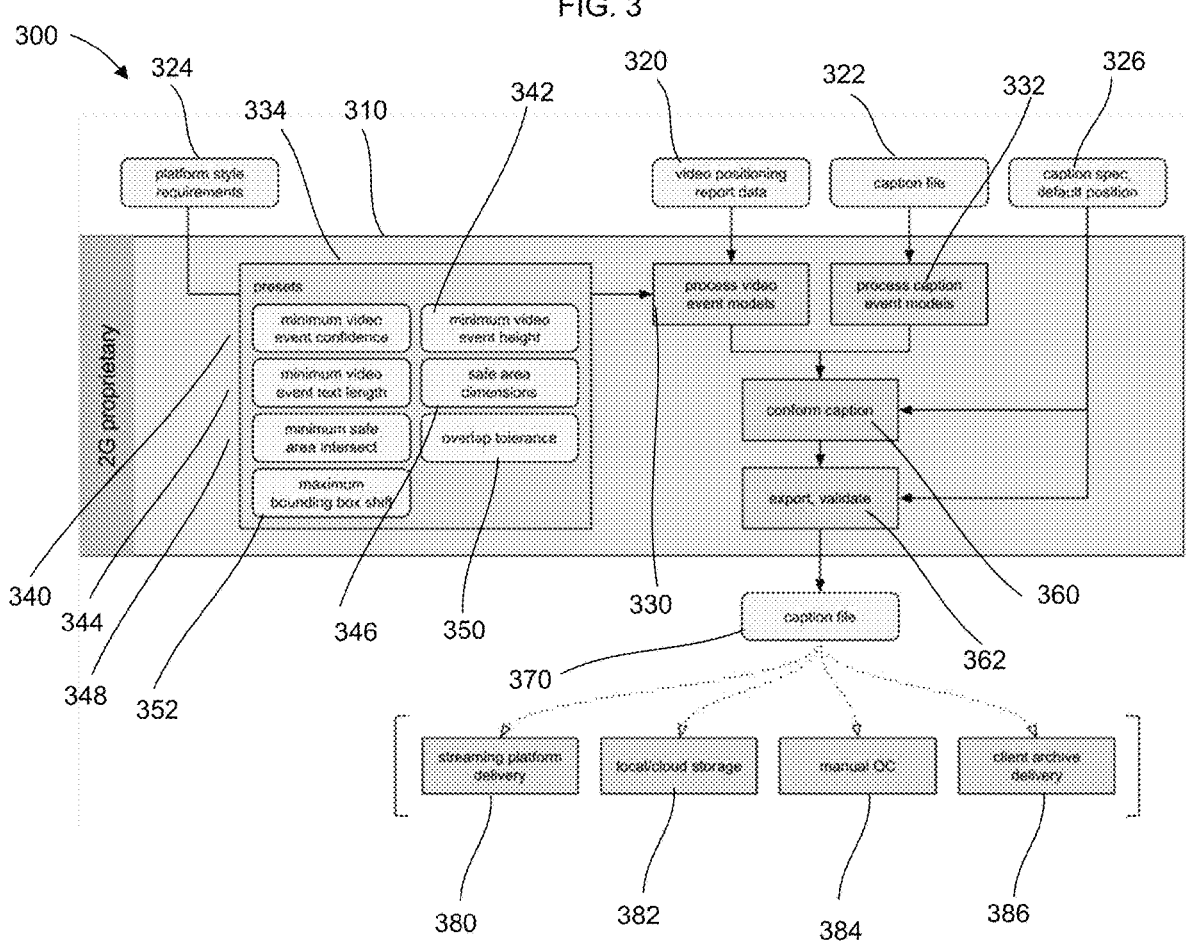
FIG. 3 is an example system that allows for the positioning of captions in a combined video file and caption file.

FIG. 3 is a is block diagram of a system 300 that automatically positions captions via a captioning engine 310. The system 300 may be executed by a computer system with a suitable processor with appropriate data communication for the different input files. The captioning engine 310 processes several input files that include a video positioning report 320, a caption file 322, and a platform style requirements file 324. A default position and caption specification input 326 is also provided. The video positioning report 320 includes all video events, such as text objects, in each frame for a video file. The raw video positioning data report 320 contains time code and bounding boxes of detected on screen text events or other graphics in a video file. This data can be produced from a third party video analysis service such as Google Video Intelligence or Amazon Rekognition or a custom Object Detection machine learning pipeline. In this example, the produced data may be in a data structure such as JSON data of objects for each detected text with time. The caption file 322 includes the captions and the corresponding timestamps relating to the video file for the proper time synchronization of the captions with the frames of the video file. The platform style requirements file 324 includes variables for the example system that can be dynamically adjusted for specific platforms or style requirements that differ according to the user. The platform style requirements can be predefined or left optional for the user. When implementing the example system, there may be an initial onboarding of style requirements and preferences specific to caption positioning.

The data from the input files 320, 322, and 324 is input into a video events model 330 and a caption events model 332. The video events model 330 processes incoming positioning report data and loads the positioning report to a canonical data model of the captioning engine 310. The caption events model 332 processes incoming caption file data and loads the processed data into the canonical data model. The platform style rule set 324 is parsed into a preset input set 334. The preset input set 334 provides a means to filter out of consideration artifacts with peripheral value that have the potential to diminish the quality of the result for a viewer. The preset input set 334 thus will result in the captions to be positioned in the default position of the bottom of the frame. Multiple versions of presets can be saved as profiles and loaded dynamically to the system 300 to change the sensitivity for different types of content such as game shows, sporting events, or sitcoms.

The preset inputs 334 include a minimum video event confidence value 340, a minimum video event height value 342, minimum video event text length value 344, a set of safe area dimension values 346, a minimum safe area intersect value 348, an overlap tolerance value 350, and a maximum bounding box shift value 352.

The minimum video event confidence value 340 is a preset requirement for data in the positioning report. The minimum video event confidence value 340 reflects the minimum video event confidence score to be considered for processing. Video events with a confidence score below the minimum are ignored. Machine learning models, such as those used for text detection in third party services, generally include a confidence score output. An example confidence score is a number between 0 and 1 that represents the likelihood that the output of a Machine Learning model is correct and will satisfy a user's request. The minimum video event height 342 is a preset requirement for the minimum video event bounding box height as a percent of total video height to be considered for processing. Video events with a bounding box height below the minimum are ignored by the process.

The minimum video event text length 344 is a preset requirement for minimum text length, or character count, of a detected video event to be considered for processing. Video events with a text length below the minimum are ignored by the process.

The set of safe area dimensions 346 define a safe area, such as a rectangle, drawn inside the dimensions of the video file. The safe area dimensions are represented as a percent from top, percent from bottom, percent from left, and percent from right edges of each frame. When processing positioning report data is collected, the area and position of each video event are compared against the safe area to determine what percent of the total area of the video event intersects the safe area.

The minimum safe area intersect 348 is a preset requirement for the minimum percent of the area of a video event that intersects with the safe area to be considered for processing. Video events with a safe area intersect percentage below the minimum are ignored by the positioning process. The overlap tolerance 350 is a platform specific variable for caption and video event overlap tolerance. The overlap tolerance is added to the start time and end time of each event when comparing intervals. The maximum bounding box shift 352 is a preset requirement for the maximum delta of a bounding box position for a video event as the video event moves across the picture frame. Video events with a bounding box shift delta above the maximum percentage are ignored by the positioning process.

A conform caption routine 360 accepts the outputs of the video events model 330, the caption events model 332, and the caption specification input 326. The conform caption routine 360 conforms the caption and event time code. Thus, the time code in and time code out of a caption event is compared against each time code in and time code out of a video event. The comparison is performed with a formula for interval comparison. For example, given a function that accepts time codes in, out, and a tolerance interval_comparison (video_in, video_out, caption_in, caption_out, tolerance) has_overlap TRUE/FALSE may be calculated with the following formula:

$$(\text{caption\_in} - (\text{tolerance} * .5)) <= (\text{video\_out} + (\text{tolerance} * .5)) \text{ and}$$

$$(\text{video\_in} - (\text{tolerance} * .5)) <= (\text{caption\_out} + (\text{tolerance} * .5))$$

For each video event compared, if the interval comparison resolves to True, an overlap of the caption may occur. The on-screen positions of the video event are collected to a common list for the caption event (video_positions) and the routine toggles an overlap variable (has_overlap) of the video event to True. After performing interval comparison against all video events, an overlap variable (has_overlap) of each caption event is checked as True or False. If the variable is False, the caption event does not share the screen with any on-screen text events and the caption event is conformed to the default position such as the top or bottom area on the image. If the caption event overlap variable (has_overlap) is True, then the current position of the caption event is compared against the collected video positions to determine if the current position of the caption event needs to be changed.

The output of the conform caption routine 360 is fed into an export validate module 362. The export and validate module 362 produces a caption file 370. The caption file 370 may be combined with a video file to produce a video with the inserted and properly positioned captions. The caption file 370 may be included in normal delivery workflows where the caption file may be archived for future use. Alternatively, the file may be ingested to a streaming platform where it is combined with video. The module 362 validates the result to check the process. Types of validations may include determining if the syntax of the caption file is accurate; determining time codes of each caption are in sequence; and determining the caption file is correct UTF-8 text encoding. The caption file 370 may then be delivered to a broadcast platform via existing delivery workflows. In this example, the broadcast platform may include a streaming platform 380, a local or Cloud storage system 382, a workstation 384 for manual quality control, or a repository 386 operated by an external client for later editing or broadcast.

Figure 4A:
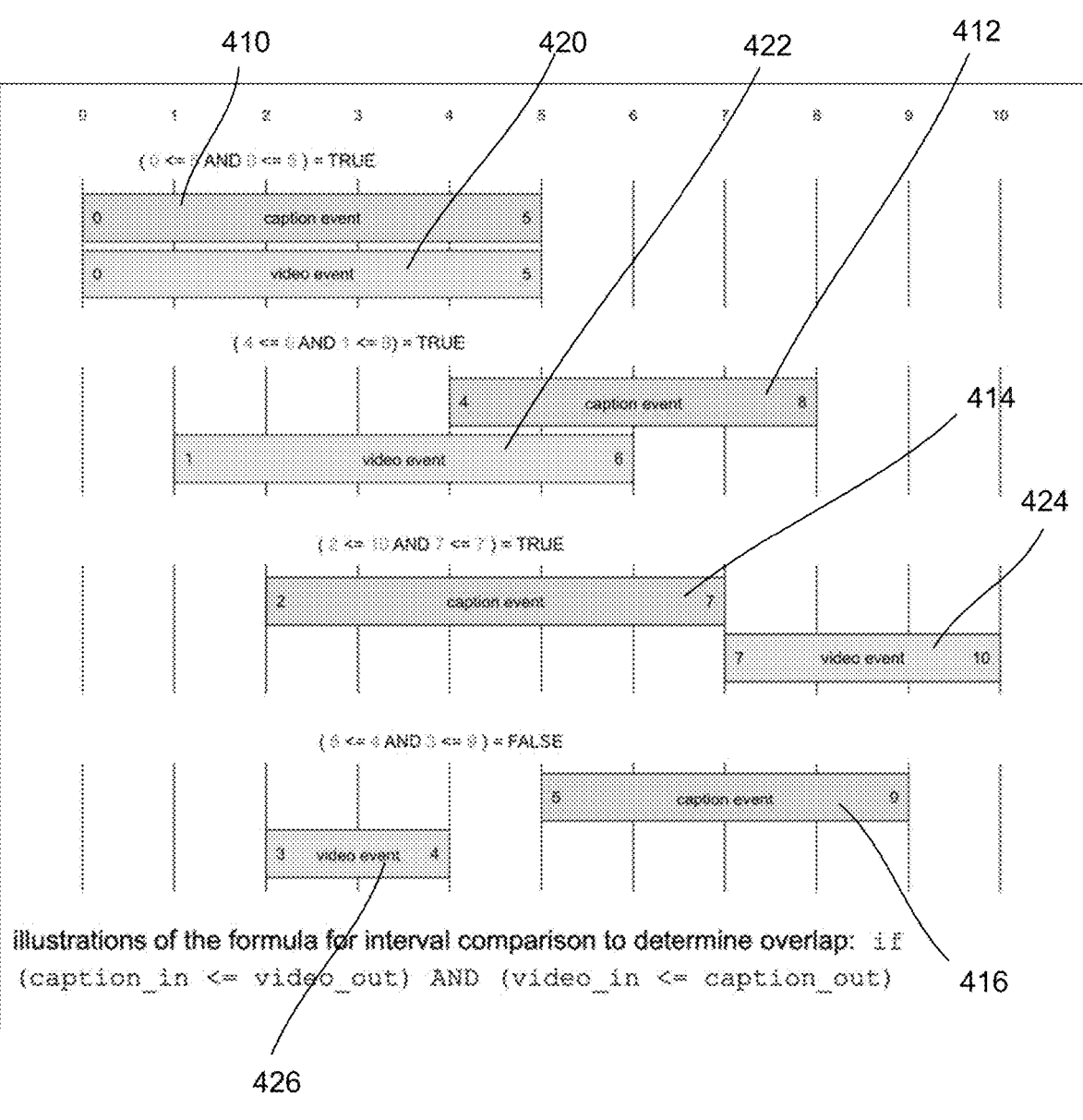
FIG. 4A is an example of different overlapping video and captioning events that may be processed by the example system.

FIG. 4A illustrates an example chart of an output of the interval comparison formula executed in the conform caption routine 360 in FIG. 3. A first caption event 410 has a time stamp between 0 and 5. A corresponding video event

420 has a time stamp between 0 and 5. In this example, the overlap flag is set as True as the time stamps overlap. A second caption event 412 has a time stamp between 4 and 8. A corresponding video event 422 has a time stamp between 1 and 6. In this example, the overlap flag is set as True as the time stamps overlap during time segments 4 and 6. A third caption event 414 has a time stamp between 2 and 7. A corresponding video event 424 has a time stamp between 7 and 10. In this example, the overlap flag is set as True as the time stamps overlap for the time segment 7. A final caption event 416 has a time stamp between 5 and 9. A corresponding video event 426 has a time stamp between 3 and 4. In this example, the overlap flag is set as False as no time stamps overlap.

Figure 4B:
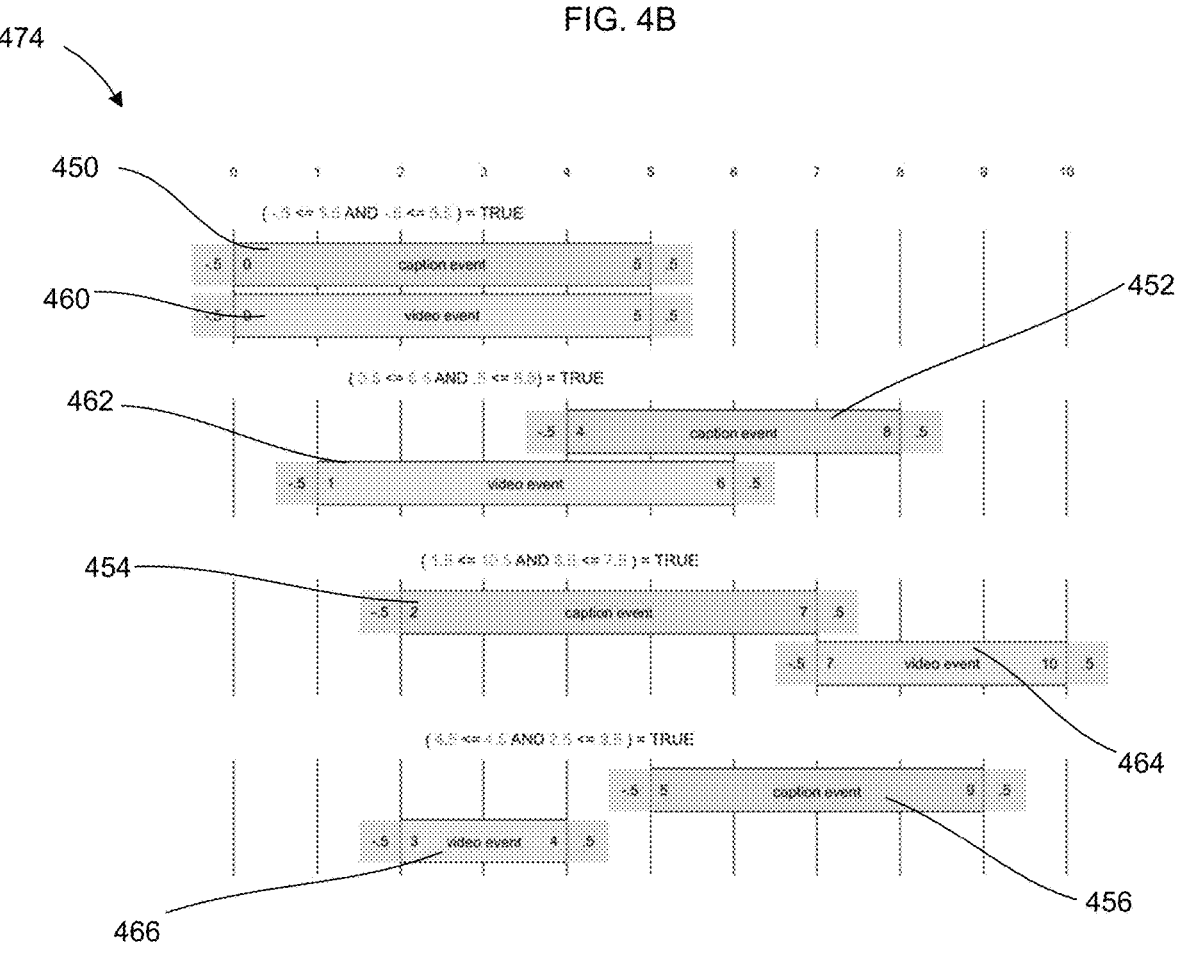
FIG. 4B is an example of different overlapping video and captioning events with a tolerance period that may be processed by the example system.

FIG. 4B shows another chart of different outcomes for format overlaps between the caption file and the video file when tolerance values are added to each of the events in the caption file and the video file. In this example, a tolerance value of 1 is added. A first caption event 450 has a time stamp between 0 and 5. A corresponding video event 460 has a time stamp between 0 and 5. Both events are buffered by 0.5 on both sides. In this example, the overlap flag is set as True as the time stamps overlap. A second caption event 452 has a time stamp between 4 and 8. A corresponding video event 462 has a time stamp between 1 and 6. Both events are buffered by 0.5 on both sides. In this example, the overlap flag is set as True as the time stamps overlap during time segments 3.5 and 6.5, incorporating the tolerance periods. A third caption event 454 has a time stamp between 2 and 7. A corresponding video event 464 has a time stamp between 7 and 10. Both events are buffered by 0.5 on both sides. In this example, the overlap flag is set as True as the time stamps overlap for the time segment 6.5 and 7.5, incorporating the tolerance periods. A final caption event 456 has a time stamp between 5 and 9. A corresponding video event 466 has a time stamp between 3 and 4. Both events are buffered by 0.5 on both sides. In this example, the overlap flag is set as True because the tolerance periods at time segment 4.5 overlap.

Figure 5:
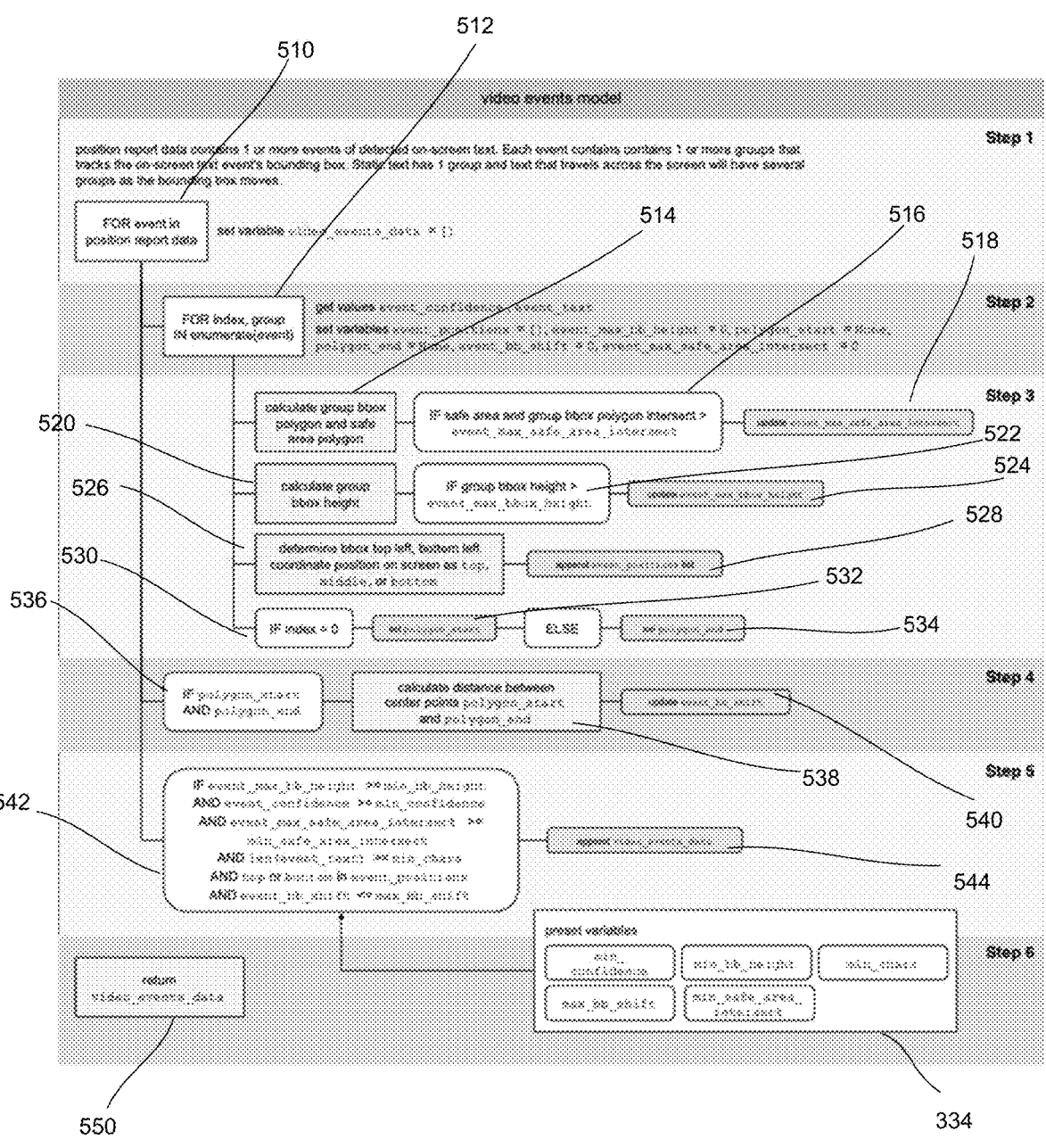
FIG. 5 is a process diagram of the routine executed by the example system to determine the occurrence of text events in a video file.

FIG. 5 is a flow diagram of the process video events model 330. The position report data from the position report 320 contains one or more events of detected on-screen objects such as text. Each such event contains one or more groups of bounding boxes in the video file that tracks the bounding box of the detected on-screen objects. For example, static text has one group and text that travels across the screen and may have several groups as the bounding box moves position relative to each of the groups. Instead of one giant bounding box that covers start and end position of the video event the video report has groups of bounding boxes for a single event, one group for each bounding box, as the text travels across the frame of video. The routine thus sets a variable of whether events data occurs for each event. As will be explained, the routine performs each of the below steps 2-5 in FIG. 5 iteratively for each detected on-screen text. In this example, an empty array variable video_events_data is set to collect the processed video event model objects (510). This process of steps 2-5 is iterated through each event in the data from the video positioning report 320. The routine then iterates through the group of each detected on-screen text to track the index of each group and calculate the model attributes (512). Specifically, the routine gets the event confidence (event_confidence) and event text (event_text) values. The routine sets the event position (event_positions) to =[ ], an empty array or empty list to start collecting results during the routine, the event maximum bounding box height (event_max_bb_height) to zero, the polygon start (polygon_start) to None, the polygon end (polygon_end) to none, the event bounding box shift (event_bb_shift) to 0, and the event maximum safe area intersection (event_max_safe_area_intersect) to 0.

The routine then calculates various properties of the video event model while iterating through the groups of each text event. The routine first determines if the detected text is inside a preset safe area. The safe area and group bounding boxes are converted to polygon objects (514). The overlap of polygon objects is calculated as a percentage of the total area of the group Polygon (516). If the overlap is greater than the event maximum safe area intersection (event_max_safe_area_intersect) variable then the maximum safe area variable is updated with a global variable outside of the loop iteration (518). After processing all groups, the maximum safe area intersection variable (event_max_safe_area_intersect) will be the maximum safe area overlap for that event.

The routine then calculates the group bounding box height (520). The routine then determines the group bounding box height exceeds the maximum height of the event box variable (event_max_bbox_height) (522). If the group bounding box height exceeds the maximum height of the event box, the routine sets the maximum height of the event box variable (event_max_bbox_height) to the group bounding box height (524). After processing all groups, the maximum bounding box height variable (event_max_bbox_height) will be the maximum height of the bounding box for that event.

The routine then determines the top left and bottom left coordinate positions of each group to determine if the group falls in top, middle or bottom regions of the video image (526). These regions are added to the list of event positions. (528).

During the enumerated loop of groups of the event (530), the bounding box polygon of the group with index 0 of the event is saved as the polygon start (polygon_start) (532). If there is more than one group then the bounding box polygon of each subsequent group in the iteration updates the polygon end (polygon_end) variable with that pounding box polygon (534). If there is only one group in the event then only the polygon start variable (polygon_start) is updated and the polygon end variable (polygon_end) remains "None." Otherwise the polygon end variable (polygon_end) represents the last position of the on screen text event.

After iterating through all the groups of a text event, polygon start (polygon_start) and polygon end (polygon_end) variables can be tested to see if the video event changed position. A single group static event will still have the polygon end variable (polygon_end) set to None and the event bounding box shift variable (event_bb_shift) variable will stay 0. The routine thus determines if the polygon start and the polygon end are present (536). If the polygon start and polygon end variables are present, the routine measures the distance between the center points between the polygon start and the polygon end (538). If there is a difference in the distance, the routine calculates the event bounding box shift variable (event_bb_shift) as the measured distance. The routine then updates the event bounding box shift variable (event_bb_shift) (540).

The routine then compares the processed video event attributes against the preset variables from the input factors 334 to filter out insignificant on-screen text results (542). Filtering out the insignificant video events drastically decreases total processing time. The conditions include whether the event maximum bounding box exceeds or equals the minimum bounding box height; the event confidence is greater than or equal to the minimum confidence; the event maximum safe area intersection is greater than or equal to the minimum safe area intersection preset; the length of the text of the event is greater than or equal to the minimum number of characters; the top or bottom are in the event positions; and the event bounding box shift is less than or equal to the maximum bounding box shift. If all of the conditions are true, the routine appends the video events data (544). After completing the iteration of all video events in the position report data the routine returns a complete array of video events data 550 to be processed against the captions for repositioning.

Figure 6:
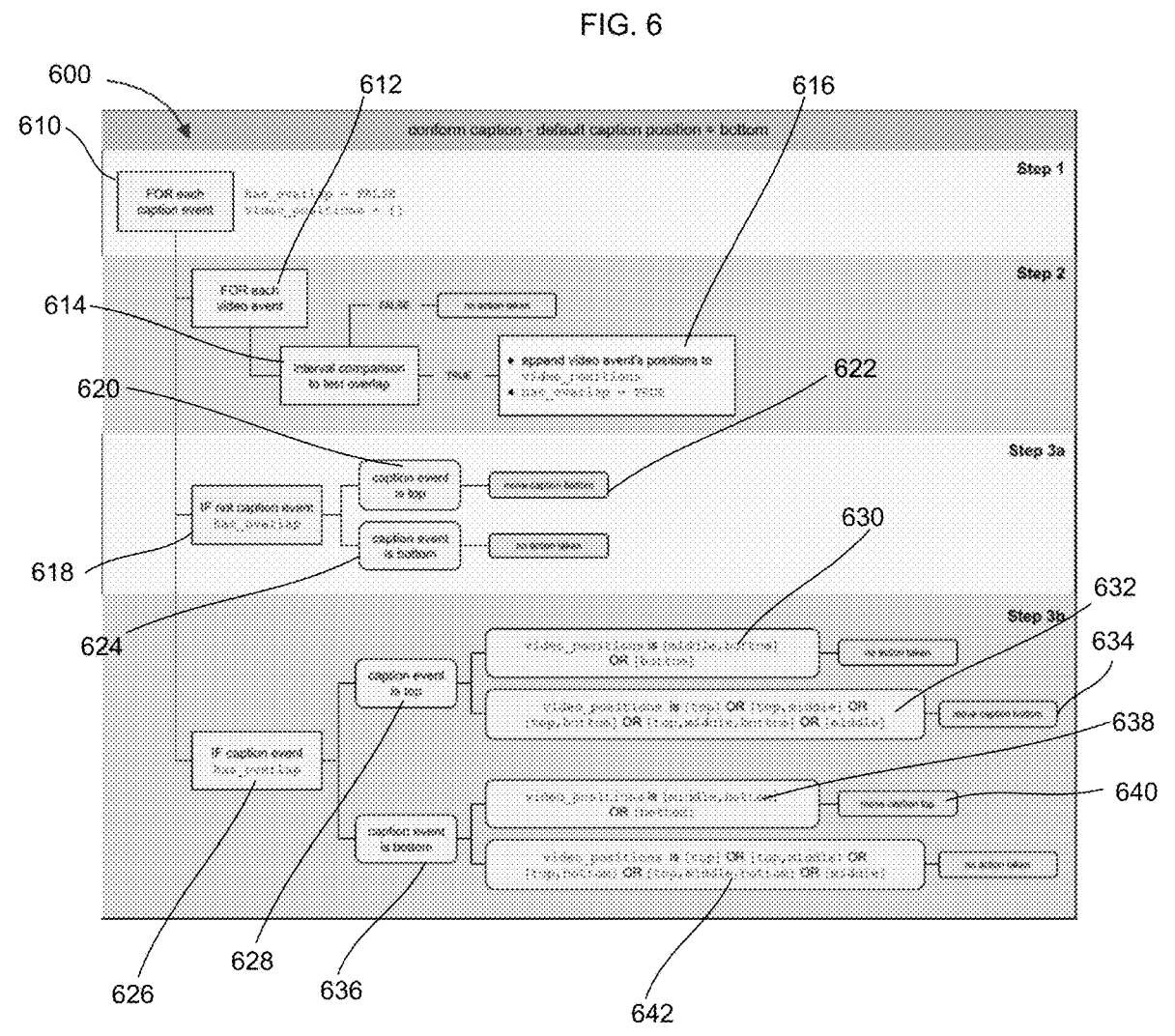

FIG. 6 is flow chart 600 that shows the steps of the conform caption routine 360 in FIG. 3 to conform the caption file 322 in FIG. 3 when the default position of the caption is at the bottom of a frame. In this example, the routine iterates through each caption event and compares the caption event against all video events to determine whether the caption event overlaps any of the video events from the processed video events model 330. For each caption event the routine sets a boolean variable for an overlap (has_overlap) and an empty array or list for a video position variable (video_positions) (610).

The routine iterates through all returned video events from the video positioning report 320 from the processed video event model 330 and performs a time code interval comparison against the current caption event to see if there is overlap (612). If there is an overlap detected (614) the overlap variable (has_overlap variable) of the current caption event is toggled to True and the video position variable (video_positions list) is updated with the position of the current video event (616). The routine then continues to the next video event. If there is no overlap detected the routine takes no action and continues to the next video event and repeats this process until all video events have been processed.

After all video events have been processed, the routine tests the overlap variable of the current caption. If the variable is False (618), the current caption does not overlap any on-screen text and should be positioned as per the platform default position which is the bottom of the frame in the example routine. The routine determines if the caption event is at the top of the frame (620). If the caption event is at the top of the frame, the routine moves the caption to the bottom of the frame as the bottom of the frame is the default position (622). The movement to the default position is important because it allows processing captions that are incorrectly positioned at the top of video frame and need to be moved back to the default bottom if no on-screen text is detected. If the caption event is at the bottom (624), no action is taken.

If the overlap variable (has_overlap) is True (626), the time code interval of the current event that represents the current caption's time code interval, or span of time it appears on screen, overlaps with one or more on-screen text events, and thus the position of the current caption must be compared against the collected list of video positions. The goal of these steps is for the current caption event to avoid occupying the same top or bottom space as any on-screen text. In some cases, there can be on-screen text in all top, bottom and middle regions of the video, in which case the caption event is positioned at the default position.

The routine determines if the caption event is at the top of the frame (628). The routine then determines if any of the collected overlapping video event positions are at the middle and the bottom or at the bottom of the frame (630). If this is the case, no action is taken, since the caption does not overlap with any of the overlapping video events. The routine determines if any of the collected overlapping video event positions are at the top and the middle, or the top and the bottom, or at the top, middle, and the bottom, or the middle of the frame (632). In this case, the routine moves the caption to the bottom of the frame to either avoid obscuring an overlapping video event or as a default if obscuring an overlapping video event is not possible (634).

The routine determines whether the position of caption event is at the bottom of the frame (636). The routine determines if any of the collected overlapping video event positions are at the middle or the middle and the bottom of the frame (638). If this is the case, the routine moves the caption to the top of the frame to avoid obscuring any of the overlapping video events (640). If there are overlapping video events positioned at the top, or the top and the middle, or the top and the bottom, or at the top, middle, and bottom, or the middle of the frame (642), no action is taken because either the caption does not does not obscure any of the overlapping video events or the caption cannot be moved anywhere in the frame to avoid the text and thus the default bottom position is used.

Figures 7, 8:
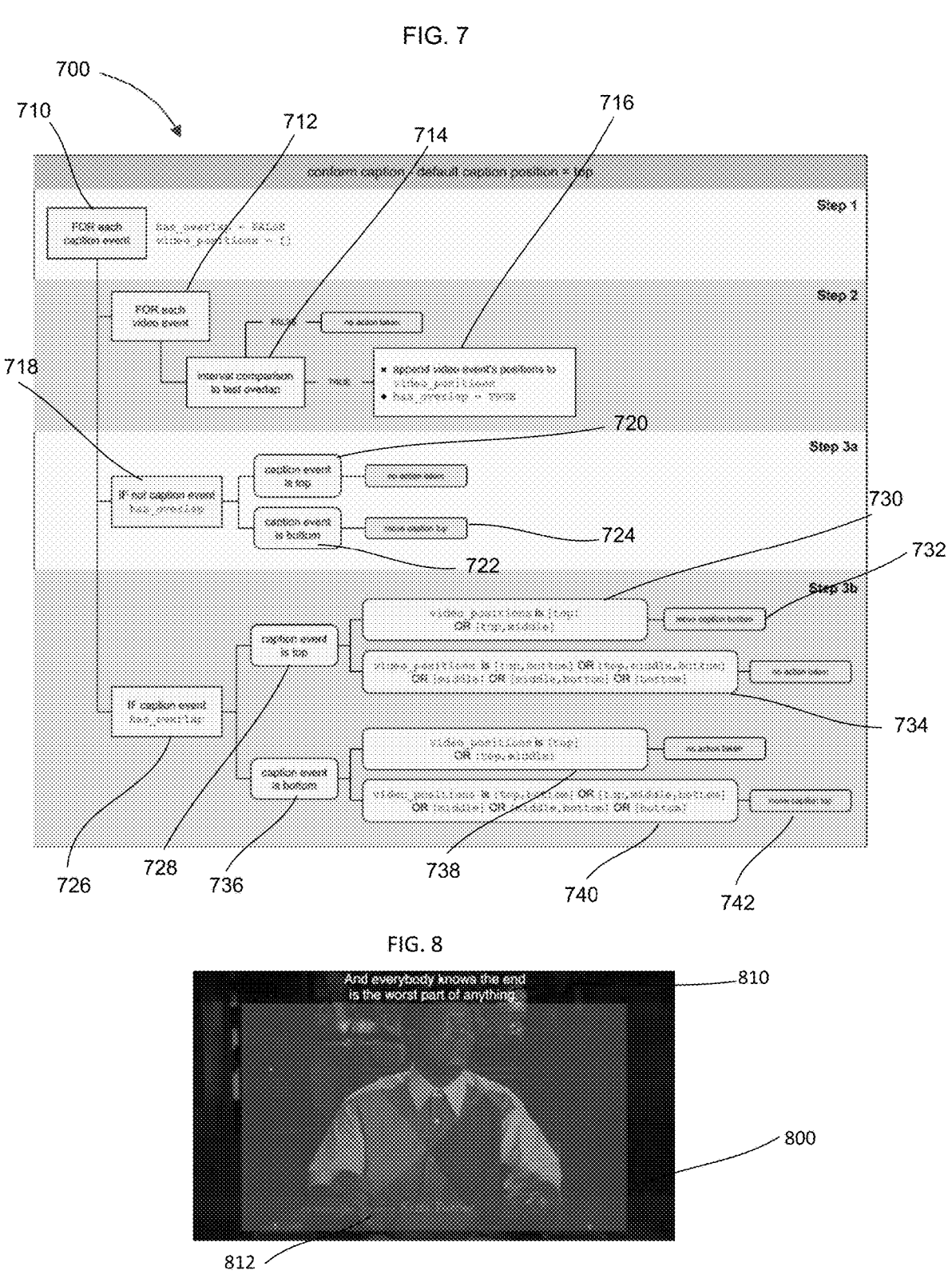
FIG. 7 is an example of a routine to position captions in a video file when operating with a default top position for a caption.
FIG. 8 is an example of the application of the modified caption files on an image taken from a sitcom broadcast.

FIG. 7 is a flow chart 700 that shows the steps of the conform caption routine 360 in FIG. 3 to conform the caption file 322 when the default position of the caption is at the top of the frame. As may be understood, the default position of the caption may be in other locations of the frame if desired and similar routines may be used to reposition the caption from the default position. In this example, the routine 700 iterates through each caption event relative to the video events. For each caption event the routine sets a boolean variable for an overlap (has_overlap) and an empty list for a video position variable (video_positions) (710).

The routine iterates through all returned video events and performs a time code interval comparison against the current caption event to see if there is overlap (712). If there is an overlap detected (714) the overlap variable (has_overlap variable) of the current caption event is toggled to True and the video position variable (video_positions list) is updated with the position of the current video event (716). The routine then continues to the next video event. If there is no time code interval overlap detected the routine takes no action and continues to the next video event and repeats until all video events have been processed.

After all video events have been processed, the routine tests the time code interval overlap variable of the current caption. If the variable is False (718), the current caption does not overlap any on-screen text and should be positioned as per the platform default position which is the top of the frame in the example routine. The routine determines if the caption event is at the top of the frame (720). If the caption event is at the top of the frame, no action is taken. If the caption event is at the bottom (722), the routine moves the caption to the top of the frame as the default position in this routine is the top of the frame (724).

If the overlap variable (has_overlap) is True (726), the time code interval of the current event that represents the current caption's time code interval, or span of time it appears on screen, overlaps with one or more on-screen text events, and thus the position of the current caption must be compared against the collected list of video positions. As explained above the routine is designed for the current caption event to avoid occupying the same top or bottom space as any on-screen text. In some cases there can be on-screen text in all top, bottom and middle regions of the video, in which case the caption event is positioned at the default top position.

The routine determines if the caption event is at the top of the frame (728). The routine determines if any of the collected overlapping video event positions are at the top or middle of the frame (728). If this is the case, the routine moves the caption to the bottom of the frame to avoid obscuring any of the overlapping video events (732). The routine determines if any of the collected overlapping video event positions are at the top or bottom, or in all three regions, or the middle or the middle and bottom or just the bottom of the frame (734). In this case, no action is taken since the caption either does not obscure any of the overlapping video events or cannot be moved anywhere in the frame to avoid the text and thus the default top position is used.

The routine determines whether the position of caption event is at the bottom of the frame (736). The routine determines if any of the overlapping video event positions are at the top or the top and the middle of the frame (738). If this is the case, no action is taken because the caption does not overlap with the any of the overlapping video events. If the collected video positions of the overlapping video events are at the top and the bottom or the top, middle and bottom, or the middle, or the middle and the bottom, or just the bottom (742), the routine moves the caption to the top of the frame (740). This is done either to avoid obscuring an overlapping video event or as a default if obscuring an overlapping video event is not possible.

Figure 9:
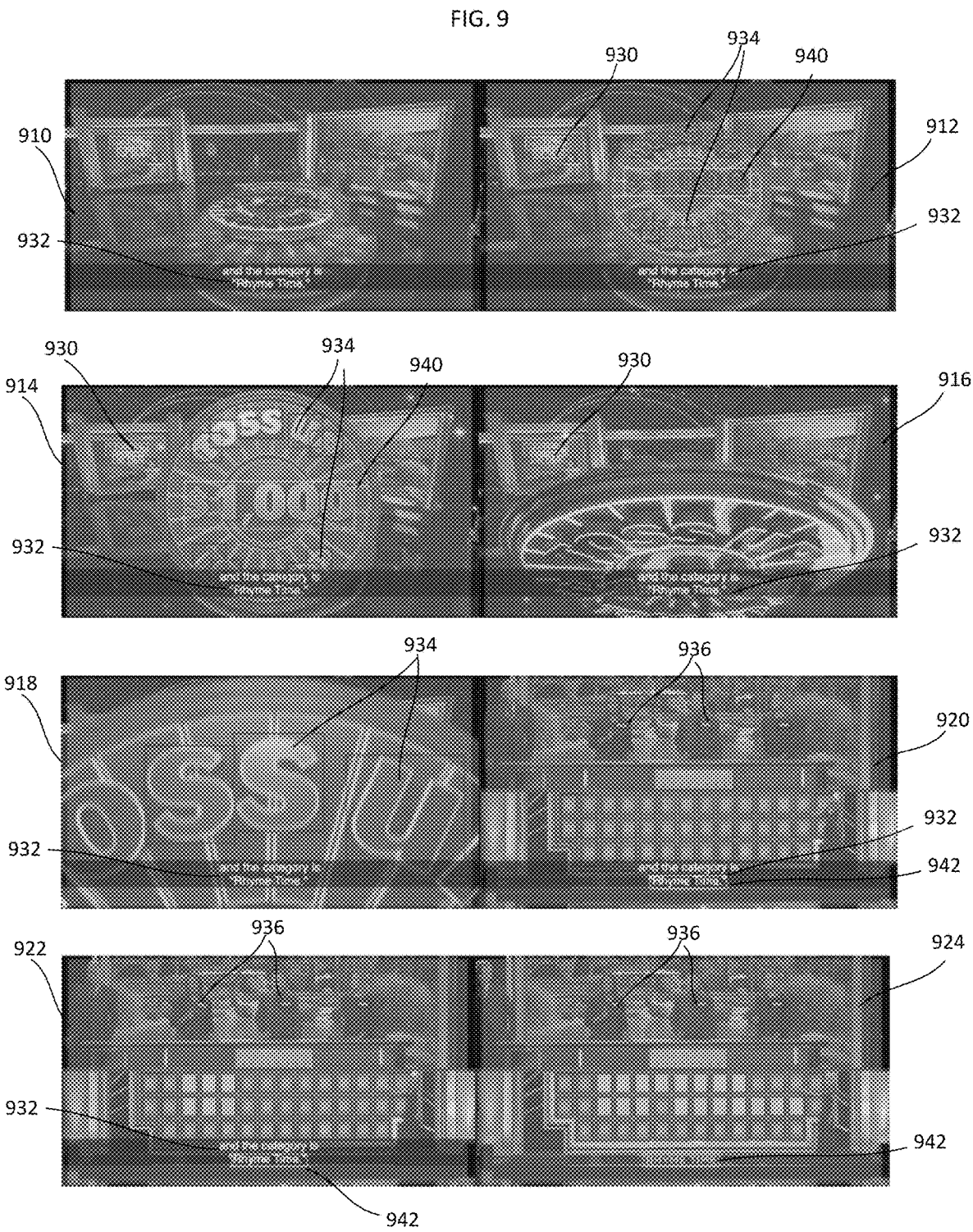
FIG. 9 is an example of how preset attributes assist in caption positioning on images taken from a gameshow broadcast.
Figure 10:
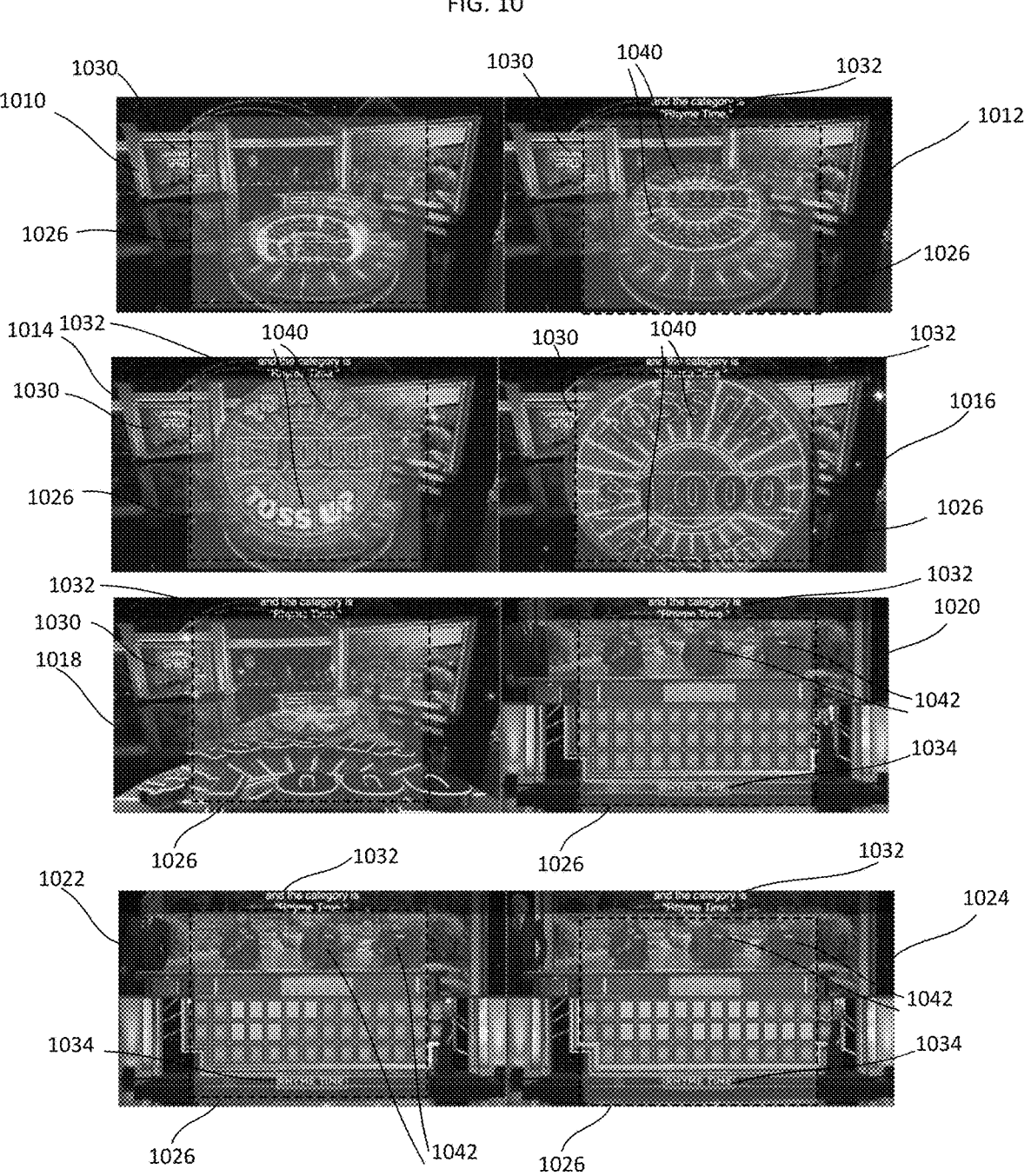
FIG. 10 is another example of how preset attributes assist in caption positioning on images taken from a gameshow broadcast.

FIGS. 8-10 are examples of the application of the above routines to present captions showing how preset values effect the position of captions for different content. FIG. 8 shows an example image 800 that results from a preset for a "Sitcom" type program. In this example, preset values are used to focus on video events in a safe area that would be considered "plot pertinent". An opening credit text event 812 is clearly in the safe area so captions 810 are processed and repositioned to the top of the image. The caption 810 thus does not overlap opening credit text event 812.

FIG. 9 shows an example series of broadcast images 910, 912, 914, 916, 918, 920, 922, and 924 of game show content. The first three images 912, 914, and 916 have a "Shopping Spree" text video event 930. The images 912, 914, and 916 do not have a safe area as the "Shopping Spree" text video event 930 occupies the top region. In this example, the video event 930 overlaps a time code duration of a caption event 932. In this example, the time code duration of the caption event 932 extends through all of the images 910, 912, 914, 916, 918, 920, 922, and 924. As shown in the image 914, a series of bounding boxes 934 that bound the text from a "TOSS UP" motion graphic. The graphic is detected as individual letters and is ignored for processing because the letters do not meet the preset min_chars minimum number of characters. Another example of a detected graphic where detected text is ignored from processing is boxes 936 for detected text for each contestant's name tag in the images 920, 922, and 924. In this example, the detected text from each contestant's name tag in the images is ignored from processing because the text does not meet the preset min_bb_height minimum bounding box height.

The images 912 and 914 show other plot pertinent video events bounded by a box 940 representing the amount won in the game show. In this example the amount won meets the minimum number of characters and the minimum bounding box height. However, the box 940 is positioned in the middle of the video frame and will not interfere with top or bottom positioned captions. The most significant plot pertinent on a screen text event box 942 is a puzzle clue "RHYME TIME" that occupies the bottom region of the video frame in the images 920, 922 and 924. Both video events in respective boxes 930 and 942 overlap the time code duration of a caption event 932 that covers the images 910, 912, 914, 916, 918, 920, 922, and 924. As shown in the image 922, if there is both top and bottom video events then the caption 932 is left in the default bottom position. Because there is no safe area preset, the "Shopping Spree" video event 930 is processed against the caption with top position in the image 922. However, the "RHYME TIME" video event in the box 942 is a plot-pertinent video text event and the bottom caption placement disrupts the viewer experience. Thus, the caption is removed as shown in the image 924. Thus the duration of the caption event in box 932 only plays through images 910, 912, 914, 916, 918, 920 and 922. Then the caption ends and disappears from the video playback revealing the obstructed on screen text puzzle clue "RHYME TIME" in box 942 that appears in images 920, 922 and 924.

FIG. 10 shows another series of images 1010, 1012, 1014, 1016, 1018, 1020, 1022, and 1024 of game show content in FIG. 9. However, in the images 1010, 1012, 1014, 1016, 1018, 1020, 1022, and 1024, a safe area preset for game shows is used to narrow the focus to filter out insignificant video text events on the edges of the frame. A smaller safe area 1026 is defined in the images in FIG. 10.

The images 1012, 1014, 1016, 1018, and 1020 have a "Shopping Spree" text video event in a box 1030. The detected on screen text "Shopping Spree" 1030 does not meet the min_safe_area_intersect preset requirement and is ignored from processing resulting in the caption 1032 being properly positioned top of screen and the user can clearly read the puzzle clue 1034 when it appears in image 1020. Bounding boxes 1040 from a "TOSS UP" motion graphic are detected as individual letters and are ignored for processing because it does not meet the preset min_chars minimum number of characters. The detected text from each contestant's name tag in boxes 1042 is ignored from processing because the text does not meet the preset min_bb_height minimum bounding box height.

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a "control system" on data stored on one or more computer-readable storage devices or received from other sources.

The term "control system" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware, generalized hardware made specialized by the execution of software thereon that enables the hardware to perform specific function, software stored on a computer-readable medium, or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A system for positioning a caption on image frames in a video file, the system comprising:
    a storage device storing a video event file and a caption event file, wherein the video event file includes a first time code indicating a video event on a first set of multiple image frames of the video file and a position of the video event on a first set of image frames of the video file, and wherein the caption event file includes a second time code and a corresponding caption, the second time code of the caption event file indicating the insertion of the caption on a second set of image frames of the video file;
    a captioning engine that determines an overlap between the first time code of the video event and the second time code of the caption event file and compares the position of the video event to a default position of the caption;
    a positioning engine that assigns the caption to a selected position on the second set of image frames that does not interfere with the video event if an overlap occurs between the time code of the video event and the time code of the caption event file and if an overlap occurs between the positions of the video event and the caption; and
    an output that produces a modified caption event file with the caption assigned to the selected position.

2. The system of claim 1, wherein the video event is text.

3. The system of claim 1, wherein the video event is an object.

4. The system of claim 1, wherein the video event and the position of the video event is determined by a scan of the image frames in the video file via a video analysis application.

5. The system of claim 1, wherein the selected position is one of a top, middle or bottom of the image frames.

6. The system of claim 1, wherein the video event file includes a bounding box associated with the position of the video event in the image frames.

7. The system of claim 1, wherein a default position of the caption is the top of the image frames or the bottom of the image frames, and wherein the captioning engine applies the caption in the default position when no overlap in time codes or position occurs.

8. The system of claim 1, wherein the storage device stores a preset requirement file, the preset requirement file including at least one preset requirement that must be met for the positioning engine to apply the caption to the selected position.

9. The system of claim 8, wherein the at least one preset requirement includes one of a group consisting of a minimum video event confidence score; a minimum video event height for a bounding box of the video event; a minimum video event text length; a set of safe area dimensions of the image frames; and an overlap tolerance.

10. The system of claim 8, wherein the at least one preset requirement is a determination whether the video event is in a position in the image frames that is plot pertinent to program content of the video file.

11. The system of claim 1, further comprising a transmission interface to send the modified caption event file to a broadcast system broadcasting the video file.

12. A method of positioning a caption comprising:

reading a first position of a video event on a set of image frames from a video file, the first position of the vide event and a first time code indicating the set of image frames stored in a video event file;

receiving a caption of a closed caption file associated with a second time code of the caption indicating the insertion of the caption in the set of image frames;

selecting a second position on the set of image frames that does not interfere with the first position of the video event; and outputting a modified closed caption file with the selected second position on the set of image frames of the caption.

13. The method of claim 12, further comprising applying the caption on the selected second position on the set of image frames from the modified closed caption file to output a set of image frames of a modified video file.

14. The method of claim 12, wherein the video event is text or an object.

15. The method of claim 12, wherein the video event and the first position of the video event is determined by a scan of the set of image frames via a video analysis application.

16. The method of claim 12, wherein the selected second position is one of a top, middle or bottom of the image frames.

17. The method of claim 12, wherein the video event includes a bounding box associated with the first position of the video event in the image frames.

18. The method of claim 12, wherein a default position of the caption is the top of the image frames or the bottom of the image frames, and wherein the caption is applied in the default position when no overlap in a second time code associated with the video events and the first time code or position of the video event and caption occurs.

19. The method of claim 12, further comprising accessing a preset requirement file, the preset requirement file including at least one preset requirement that must be met to apply the caption to the selected second position.

20. The method of claim 19, wherein the at least one preset requirement includes one of a group consisting of a minimum video event confidence score; a minimum video event height for a bounding box of the video event; a minimum video event text length; a set of safe area dimensions of the image frames; and an overlap tolerance.

21. A non-transitory computer readable medium having stored thereon software instructions that, when executed by a processor, cause the processor to:

read a first position of a video event on a set of image frames in a video file, the first position and a first time code associated with the set of image frames stored in video event file;

receive a caption of a closed caption file associated with a second time code associated with the set of image frames;

select a second position on the set of image frames that does not interfere with the first position of the video event; and apply the caption on the selected second position on the set of image frames to output a set of frames of a modified video file.

* * * * *